E. GIRARDEAU & J. BETHENOD.
SYSTEM FOR DIRECT ENERGIZATION OF RADIOTELEGRAPHIC ANTENNÆ.
APPLICATION FILED JUNE 17, 1913.
1,145,239.   Patented July 6, 1915.
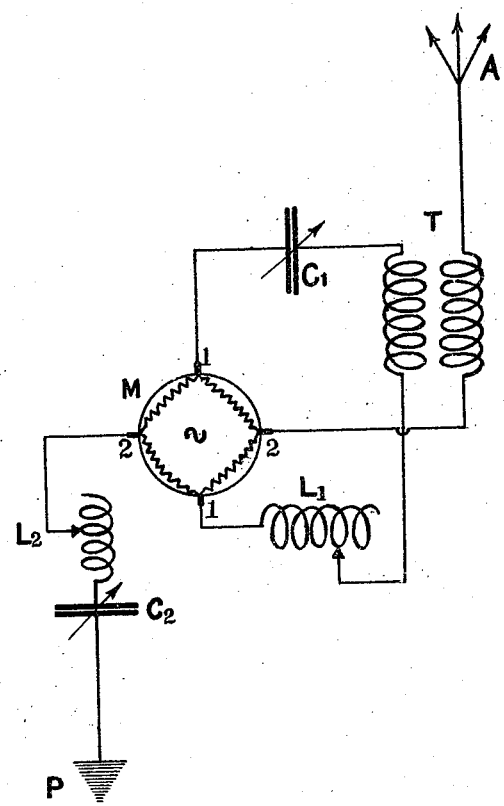

UNITED STATES PATENT OFFICE.

EMILE GIRARDEAU AND JOSEPH BETHENOD, OF PARIS, FRANCE.

SYSTEM FOR DIRECT ENERGIZATION OF RADIOTELEGRAPHIC ANTENNÆ.

1,145,239.  Specification of Letters Patent. Patented July 6, 1915.

Application filed June 17, 1913. Serial No. 774,187.

*To all whom it may concern:*

Be it known that we, EMILE GIRARDEAU and JOSEPH BETHENOD, citizens of the Republic of France, residing at 128 Rue la Boëtie, Paris, in the Republic of France, have invented certain new and useful Improvements in Systems for Direct Energization of Radiotelegraphic Antennæ, of which the following is a specification.

This invention relates to a system for direct energization of radiotelegraphic antennæ by means of high frequency polyphase alternators.

In order to obtain alternators capable of supplying frequencies sufficiently high to enable them to be used for the direct energization of radio-telegraphic antennæ of great wave length, it has been proposed to place several alternators in cascade, the armature of one energizing the field of the other. This arrangement is possible in connection with either single phase alternators or with polyphase alternators. Only the former however have been proposed for the direct energization of one antenna. Instead of dealing with single phase machines the present invention has recourse to polyphase generators notwithstanding the necessary increase in winding pitch in the latter machines.

The present invention relates to a system which enables a high frequency polyphase alternator (which may be of any type) to energize one antenna only, in such condition that the charge is uniformly distributed in all phases which is obviously necessary in order to benefit from the use of polyphase currents.

The accompanying drawing illustrates by way of example, one way of carrying out the invention which consists in placing one of the phases 2—2 of the alternator M, assumed to be two-phase, in series with the antenna A, the other phase 1—1 feeding a transformer T the secondary of which is also placed in series with the aforesaid antenna A. Adjustable inductances $L_1$, $L_2$ and capacities $C_1$, $C_2$ are placed in the different circuits. Under these conditions, if the mutual induction between the primary and secondary of T is appropriately chosen it is easy to show mathematically that the two phases of the alternator can be vigorously charged in an equal manner and if the values, on one hand, of $C_1$ and $L_1$ and, on the other, of $C_2$ and $L_2$ are judiciously chosen, the equal currents circulating in the circuits of the two phases will have neither lead nor lag relatively to the electromotive forces generated under no load by the machine M, and obviously the whole apparatus is thus in excellent operative condition.

What we claim and desire to secure by Letters Patent of the United States is:—

1. A system for direct energization of radio-telegraphic antennæ comprising in combination, an antenna, a high frequency polyphase alternator having the circuit carrying current of one phase in series with the antenna, a transformer having its secondary placed in series with the antenna adapted to be fed by the current of the other phase from said alternator, means for selecting the mutual induction between the primary and secondary of the transformer for allowing a uniform vigorous charging of the antenna by the two phases of the alternator, and adjustable inductances and capacities placed in the circuit of the other phase.

2. An apparatus of the character described, comprising in combination an antenna, a two phase alternator having the circuit carrying current of one phase connected in series with said antenna, a transformer adapted to be fed by current of the other phase from said alternator and comprising a secondary placed in series with the antenna, and inductances and capacities in the circuits so adjusted as to equally distribute the energy of the alternator in the antenna.

In testimony whereof we affix our signatures in presence of two witnesses.

EMILE GIRARDEAU.
JOSEPH BETHENOD.

Witnesses:
HANSON C. COXE,
JACK H. BAKER.

Copies of this patent may be obtained for five cents each, by addressing the "Commissioner of Patents, Washington, D. C."